US010053545B2

(12) United States Patent
Goulbourn et al.

(10) Patent No.: US 10,053,545 B2
(45) Date of Patent: Aug. 21, 2018

(54) POLYMERIC MATERIALS

(75) Inventors: John Goulbourn, Liverpool (GB); Andrew Stuart Overend, Bolton (GB); Christine Leeming, Manchester (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 0 days.

(21) Appl. No.: 13/996,592

(22) PCT Filed: Dec. 19, 2011

(86) PCT No.: PCT/GB2011/052519
§ 371 (c)(1),
(2), (4) Date: Aug. 30, 2013

(87) PCT Pub. No.: WO2012/085550
PCT Pub. Date: Jun. 28, 2012

(65) Prior Publication Data
US 2014/0005312 A1    Jan. 2, 2014

Related U.S. Application Data

(60) Provisional application No. 61/425,550, filed on Dec. 21, 2010.

(51) Int. Cl.
| | | |
|---|---|---|
| *C08J 3/215* | (2006.01) | |
| *C08K 5/092* | (2006.01) | |
| *C08J 3/20* | (2006.01) | |
| *C08J 3/205* | (2006.01) | |

(52) U.S. Cl.
CPC ............ *C08J 3/203* (2013.01); *C08J 3/2053* (2013.01); *C08J 2367/00* (2013.01)

(58) Field of Classification Search
USPC ............... 524/296, 298, 314; 264/171.11; 252/301.15, 301.16; 523/333
See application file for complete search history.

(56) References Cited

U.S. PATENT DOCUMENTS

| | | | | |
|---|---|---|---|---|
| 2,889,354 | A * | 6/1959 | Blake et al. | 560/127 |
| 2,924,501 | A * | 2/1960 | Wagner et al. | 264/203 |
| 3,025,266 | A * | 3/1962 | Huffman | 528/277 |
| 3,429,817 | A * | 2/1969 | Furey et al. | 508/492 |
| 4,659,764 | A * | 4/1987 | Isao | C08K 5/098 524/399 |
| 4,708,719 | A | 11/1987 | Wilson et al. | |
| 4,816,035 | A | 3/1989 | Craycroft et al. | |
| 4,832,749 | A * | 5/1989 | Vallvey | C08J 3/22 106/419 |
| 6,270,563 | B1 * | 8/2001 | Herget | C09D 11/037 106/169.41 |
| 8,487,023 | B2 * | 7/2013 | Whitehouse | 524/101 |
| 2007/0140045 | A1 * | 6/2007 | Becht et al. | 366/160.4 |
| 2009/0214456 | A1 * | 8/2009 | Greenberg | A61K 8/02 424/64 |
| 2010/0233146 | A1 * | 9/2010 | McDaniel | 424/94.2 |
| 2013/0244017 | A1 * | 9/2013 | Tresino et al. | 428/220 |

FOREIGN PATENT DOCUMENTS

| | | | |
|---|---|---|---|
| JP | 47040698 | Y1 | 12/1972 |
| JP | 49054451 | A | 5/1974 |
| JP | 5649773 | A | 5/1981 |
| JP | 357153059 | A * | 9/1982 |
| JP | 62259831 | A | 11/1987 |
| JP | 4249586 | A | 9/1992 |
| JP | 8165453 | A | 6/1996 |
| JP | 11172005 | A | 6/1996 |
| JP | 10-77433 | * | 3/1998 |
| JP | 410077433 | * | 3/1998 |
| JP | 410077433 | A * | 3/1998 |
| JP | 2001059026 | A | 3/2001 |
| JP | 2003511506 | A | 3/2003 |
| JP | 2008106154 | A | 5/2008 |
| JP | 201090326 | A | 4/2010 |
| WO | WO 2004/094122 | A1 | 11/2004 |
| WO | 2010116161 | A1 | 10/2010 |
| WO | WO 2010/116161 | A1 | 10/2010 |
| WO | WO 2010/117268 | A1 | 10/2010 |
| WO | WO2012/085550 | A3 | 6/2012 |

OTHER PUBLICATIONS

AU2011346820 Patent Examination Report No. 1, dated Jan. 9, 2015, 5 pp.

\* cited by examiner

*Primary Examiner* — Tae H Yoon
(74) *Attorney, Agent, or Firm* — Fay Sharpe LLP

(57) ABSTRACT

A method of introducing an additive into a polymeric material comprises using a liquid formulation comprising an additive, for example a colorant, and a vehicle comprising an aliphatic or aromatic tri- or di-carboxylic acid covalently linked by ester bonds to two or more chains. The method involves contacting the liquid formulation with the polymeric material in a melt processing apparatus. The cavity transfer mixer may be used in the process. A fiber is suitably subsequently produced.

17 Claims, 1 Drawing Sheet

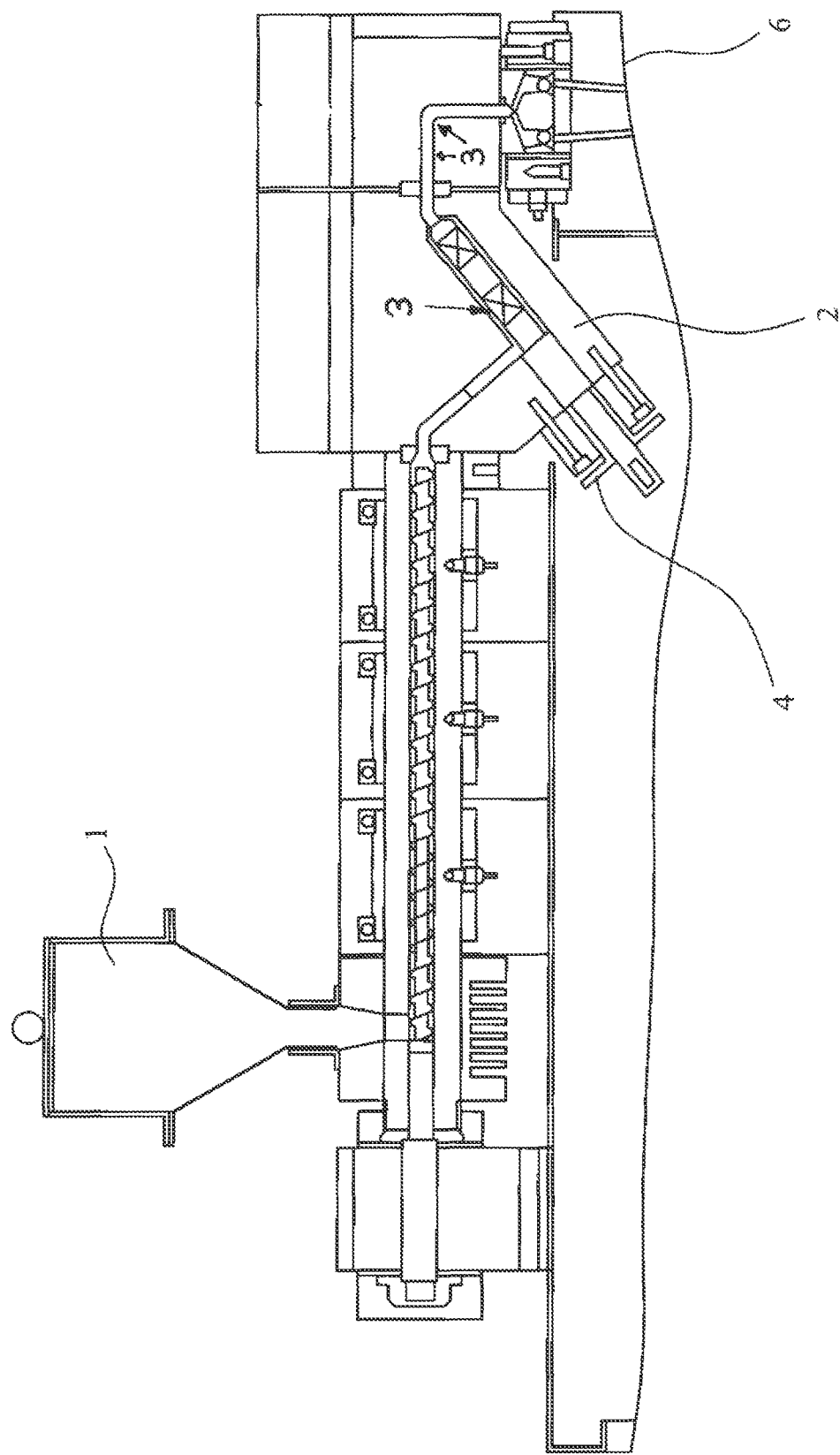

POLYMERIC MATERIALS

This application is a National Stage Entry of International Application No. PCT/GB2011/052519, filed Dec. 19, 2011, which claims priority to U.S. Provisional Application Ser. No. 61/425,550, filed Dec. 21, 2010.

This invention relates to polymeric materials and particularly, although not exclusively, relates to incorporation of additives into polymeric materials, for example polyesters, such as in polyester fibre production.

It is known to incorporate additives, (e.g. colorants, stabilizers, delusterants, anti-static agents, optical brighteners, processing aids etc.) into fibres post-production by bath dyeing or spin dyeing. However disadvantageously, this requires large volumes of liquid additive formulations to enable the additive to permeate into the fibre; the process can be time-consuming; and the fibre must be dried following the permeation process.

It is also known to use a masterbatch containing additives to introduce the additives into a polymer. For example pellets of the masterbatch and pellets of the polymer may be introduced into an extruder via its feedthroat and the two components melt-processed together. Disadvantageously, however, cleaning of the extruder is time-consuming, since the entire length of the extruder needs cleaning between, for example colour changes; and dosing and handleability of solid pelletized masterbatch can be challenging. In addition, some properties of materials, for example spun fibre, made using masterbatches, may be detrimentally affected.

A preferred method of incorporating additives would be incorporation of a liquid into a polymer melt. This may be achieved using a formulation comprising a carrier medium or vehicle in which the additive is dispersed prior to injection into the melt. However, disadvantageously, it is found that use of the formulation may lead to carrier degradation, die head pressure drop, fuming at the die head and/or poor properties of the polymeric material after incorporation of the additive.

It is an object of the present invention to address the aforementioned problems.

According to a first aspect of the invention, there is provided a method of introducing an additive into a polymeric material comprising:

A) selecting a liquid formulation comprising an additive (for example a colourant) and a vehicle comprising an aliphatic or aromatic tri- or di-carboxylic acid covalently linked by ester bonds to two or more chains;

B) contacting the liquid formulation with said polymeric material in a melt processing apparatus.

The chains could be optionally-substituted, preferably unsubstituted, linear or branched, alkyl groups. The chains could comprise linear or branched alkyl groups with between 5 and 15 carbon atoms, more preferably 7 and 10 carbon atoms which are preferably unsubstituted. An example of preferred branched alkyl chains is 2-ethylhexyl.

The chains could also comprise polyalkoxylated fatty alcohol chains. The preferred fatty alkoxylated esters are polyalkoxylated fatty alcohol chains:

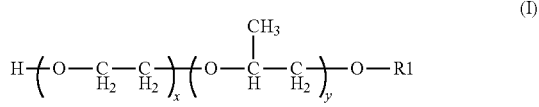

(I)

The chains suitably form ester bonds via the —O— moiety at the left hand side of structure I.

The chains could also comprise Citric acid esters:

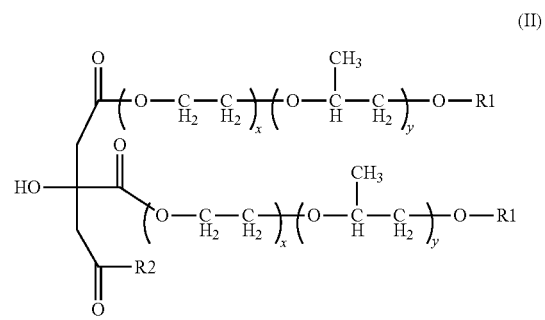

(II)

where R2 is either —OH or a polyalkoxylated fatty alcohol chain of the same or similar structure to (I). Said citric acid esters may form ester bonds with the carboxylic acid via the —OH group shown at the left of structure II.

R1 may be unsaturated or saturated, unsubstituted or substituted, aromatic or aliphatic fatty moiety with between 1 and 20 (for example between 1 and 10) carbon atoms. x and y may independently be between 0 and 10. The sum of all x and y must be greater than 0. The sum of all x and y preferably does not exceed 70.

The aliphatic dicarboxylic acid species may contain between 2 and 22 carbon atoms in the main structural backbone, more preferably between 2 and 10 with a typical structure being outlined below:

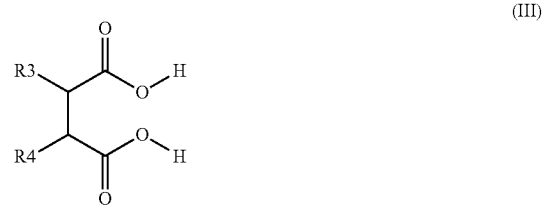

(III)

where $R^3$ and $R^4$ independently represent optionally-substituted alkyl, alkenyl or alkynyl groups or $R^3$ and $R^4$ together with the atoms to which they are bonded define an optionally-substituted cyclic moiety. $R^3$ and $R^4$ suitable independently include 0-20, preferably 2-10, more preferably 2-4 carbon atoms. Examples of dicarboxylic acids include succinic acid, malonic acid and maleic acid.

Preferably, $R^3$ and $R^4$ together with the atoms to which they are bonded define an optionally-substituted cyclic, preferably aromatic moiety. Preferably, said aromatic moiety has six ring atoms, preferably six ring carbons atoms. Optional substituents of the cyclic, for example aromatic, moiety, may be independently selected from ester and optionally-substituted, preferably unsubstituted, alkyl groups. When said cyclic moiety is substituted, it is preferably substituted at two or fewer or one or fewer positions. Thus, preferably, at least two substituents on the cyclic structure represent hydrogen atoms and preferably three or all four of the substituents on the cyclic structure represent hydrogen atoms.

Preferred aromatic carboxylic acids may contain between 6 and 20, more preferably 8 and 12 carbon atoms. Preferably, said carboxylic acid is of general formula:

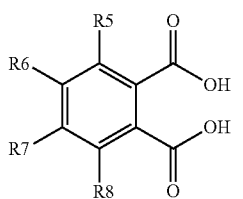

(IV)

wherein $R^5$, $R^6$, $R^7$ and $R^8$ independently represent a hydrogen atom, an ester group or an optionally-substituted, preferably unsubstituted, alkyl group. An example of a suitable aromatic dicarboxylic acid is phthalic acid. 1,2 phthalic acid is preferred to give appropriate ortho functionality.

A preferred tri-carboxylic acid is of general formula:

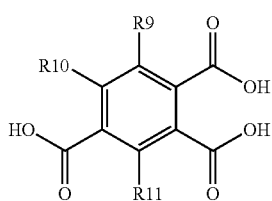

(V)

where $R^9$, $R^{19}$ and $R^{11}$ independently represent a hydrogen atom, an ester group or an optionally-substituted, preferably unsubstituted, alkyl group.

Unless otherwise stated, optional substituents described herein include halogen atoms and alkyl, acyl, nitro, cyano, alkoxy, hydroxy, amino, alkylamino, sulphinyl, alkylsulphinyl, sulphonyl, alkylsulphonyl, sulphonate, amido, alkylamido, alkoxycarbonyl, halocarbonyl and haloalkyl groups.

Unless otherwise stated, alkyl, alkenyl or alkynyl groups may have up to twenty carbon atoms, preferably up to fifteen carbon atoms, more preferably up to eleven carbon atoms.

The preferred ester-containing vehicles are formed by reacting the described di and tri-carboxylic acids with alkyl-containing moieties to provide the alkyl groups; or may be reacted with polyalkoxylated fatty alcohols or citric acid esters. The alkoxylating moieties are preferably present at between 1 and 80 moles per each fatty alcohol, more preferably between 1 and 70 and most preferably between 1 and 60 moles per fatty alcohol.

The fatty alcohols such as species I or II may be prepared by the polyalkoxylation of saturated or unsaturated, substituted or unsubstituted aliphatic or aromatic fatty alcohols. As is well known to those skilled in the art, the fatty moieties are often present as a mixture and so the vehicle may comprise a mixture of compounds.

The dicarboxylic acid based esters are suitably esterified on both the carboxylic acid moieties. The tricarboxylic acid derived compounds are suitably esterified on two or three of the carboxylic acid groups with the above described alkyl or polyalkoxylated fatty alcohol.

The fatty alkoxylate esters may be prepared by reaction of the starting alcohol with either ethylene or propylene oxide in the presence of an acidic or basic catalyst.

X represents the number of ethylene oxide which are incorporated into each fatty alcohol chain and y represents the number of moles of propylene oxide that are incorporated into the chain. The chain may consist of both block co-polymers or a mixture of the polymer types.

Preferably, said vehicle has a boiling point of greater than 285° C.

Preferably, said vehicle has a molecular weight in the range 500 to 4200 g/mol.

Preferably, said vehicle has a viscosity of between 100,000 cP and 1,000 cP, more preferably between 50,000 cP and 2,000 cP and most preferably between 5,000 and 30,000 cP as measured using a Brookfield viscometer using spindle number 7 at room temperature (e.g. 22° C.) at a torque value of ~50%. The formulation is suitably both pumpable and stable to sedimentation of any solid particulates that may be present.

BRIEF DESCRIPTION OF THE DRAWINGS

FIG. 1 illustrates one embodiment of an apparatus for use in the methods of the present application.

It is found that vehicles of the type described can advantageously be used to introduce additives into polymeric materials prior to or preferably during melt-processing, without any significant detrimental effects on the properties of the polymeric materials.

Preferably, said polymeric material comprises a synthetic thermoplastic polymer. Said polymeric material is preferably able to be formed into fibres. Said polymeric material may be a condensation polymer, for example a condensation polymer which may depolymerise in the presence of water and/or a carrier with appropriate functional groups (which could include but is not limited to hydroxyl and carboxylic acid species). Said polymeric material may be selected from polyesters, polyamides, polypropylene, polycaprolactone, polycarbonates, acrylics and aramids.

Examples of polyamides include aliphatic PA6 and PA6,6, semi-aromatic polyphthalamides (e.g. PA 6T) and aromatic polyamides in which at least 85% of the amide linkages, (—CO—NH—) are attached directly to two aromatic rings—for example the para-aramids.

Said polymeric material preferably comprises a polyester which may be selected from poly(ethylene terephthalate) (PET), poly(butylene terephthalate) (PBT), poly(trimethylene terephthalate) (PTT), poly(ethylene naphthalate) (PEN), poly(1,4-cyclo-hexylenedimenthylene) terephthalate (PCT), poly(ethylene-co-1,4-cyclohexylenedimethylene terephthalate) (PETG), copoly(1,4-cyclohexylene dimethylene/ethylene terephthalate) (PCTG), poly(1,4-cyclohexylene dimethylene terephthalate-co-isophthalate) (PCTA), poly(ethylene terephthalate-co-isophthalate (PETA), poly(lactic acid (PLA), poly(glycolic acid) (PGA) and their blends of copolymers. Said polymeric material preferably comprises, more preferably consists essentially of PET.

A typical spinnable condensation polymer such as polyester, for example PET, may have up to 250 or up to 200 repeat units (e.g. molecular weight of up to 25,000 or up to 20,000). The number of repeat units may be in the range 50-200, suitably 75-200, preferably 75-125 repeat units. A typical spinnable polymer may have about 100 repeat units. The condensation polymer may be linear and be able to reach the high levels of orientation and crystallinity which are induced during spinning and drawing processes.

Typical spinnable polyesters have an IV in the range 0.62 to 1 dl/g. Preferred polyesters have an IV within the range of 0.5 to 1.2 dl/g when measured using standard techniques (for example ASTM D4603-03).

Said additive may be selected from colourants, stabilizers, delusterants, anti-static agents, optical brighteners, processing aids, light reflective additives, anti-soil additives, friction modifiers, anti-oxidants and anti-flammability additives. Said additive preferably comprises a colourant. A said colourant may be a dye or pigment. A dye may be especially preferred.

Said liquid formulation may include less than 80%, suitably less than 70%, preferably less than 65%, more preferably less than 60% of a said additive (e.g. a colourant). Typically, said formulation includes 5-80 wt % of a said additive (e.g. a colourant). The total amount of additives (selected from colourants, stabilizers, delusterants, antistatic agents, optical brighteners, processing acids, light reflective additives, anti-soil additives, friction modifiers, anti-oxidants, insecticides and anti-flammability additives) in said formulation may be more than 1%, suitably more than 2%, preferably more than 5%; typically the total amount of additives is in the range 5-80 wt %. In one embodiment, the total amount of additives may be in the range 39-60 wt %. For the avoidance of doubt, the wt % refers to the wt % of additive excluding any vehicle (or the like) with which the additive may be formulated prior to being incorporated into the liquid formulation.

More than one additive may be required (and included in said formulation). For example, a mixture of dyes and/or pigments may be required in order to provide a colormatch to a customer requirement. Other additives which are commonly added to fibre may include light reflectance additives, anti-static or anti-soil species, friction modifiers, anti-oxidants, anti-flammability additives etc. These may be added alone or in a package together with a colored species.

The method may include introducing less than 10 wt %, more suitably less than 5 wt %, preferably less than 4 wt % of a said additive, selected from those described above (preferably a colourant), into said polymeric material via said liquid formulation. At least 1 wt % of a said additive (preferably a colourant) may be introduced via said liquid formulation. The total amount of additives, selected from those described above, introduced into said polymeric material via said liquid formulation may be less than 10 wt % more preferably less than 5 wt %. Typical amounts of additives introduced using the method described are typically in the range of 0.05-3 wt %.

Said liquid formulation may include at least 20 wt % of vehicle, for example a single type of vehicle. Said formulation may include 60 wt % or less of vehicle, for example a single type of vehicle.

Preferably, the vehicle has good compatibility with said polymeric material. Compatibility of the vehicle with polyester may be assessed by examining the level of haze that is created when mouldings are formed. Further details are provided in the specific examples which follow. The level of haze may be assessed as described in Example 7 hereinafter. The vehicle may be such that when measured as described in the aforementioned example (at 1 wt %), the haze level is less than 50%, is suitably less than 30%, is preferably less than 20%, is more preferably less than 10% and, especially, is less than 5%. In some cases, relatively incompatible carriers may be used (e.g. dosed to less than 1 wt % in the polymeric material). These may be used when lighter-coloured fibres are being produced. Other measures of compatibility may be used when alternative thermoplastic polymers are examined.

Preferred vehicles tend not to migrate excessively from polymer moldings once cooled to room temperature.

Preferred carriers give a low or minimum clouding, for example less than 50% haze at levels of up to 5 wt % in the polymeric material.

The method may comprise introducing less than 10%, preferably less than 6% and more preferably less than 4% of vehicle into the polymeric material, via said formulation. The amount introduced may be less than 3 wt %.

Solubility information can be extracted from the structure of the vehicles. Division of Hildebrand parameters into three component Hansen parameters to measure the dispersion, polar and hydrogen bonding forces can be used to discover which are the most preferred vehicle types for use in the method. A total solubility parameter can be calculated as follows:

$$\delta_t = (\delta_d^2 + \delta_p^2 + \delta_n^2)^{1/2}$$

wherein $\delta_t$ represents the total solubility parameter, $\delta_d$ represents the dispersion contribution made by the individual functional groups in the idealised chemical structure, $\delta_p$ represents the polar contribution made by the individual functional groups in the idealised chemical structure and $\delta_n$ represents the hydrogen bonding contribution made by the individual functional groups in the idealised chemical structure, The individual chemical group components may can be taken from several reference books; for example Van Krevelen D. W. and Hoftyzer P. J. Properties of polymer correlations with chemical structure Elsevier 1972 and Hansen C. M. Handbook—"Hansen Solubility Parameters: A User's Handbook", CRC Press 1999].

The difference between the total solubility parameter of the vehicle and the polymeric material itself can then be calculated and the value of the difference gives a measure of 'compatibility'. A difference of less than 10, preferably less than 8, more preferably less than 5 gives vehicles with the potential to be compatible with the polymeric material. Note, that the difference is calculated by taking the higher solubility parameter and subtracting the lower solubility parameter.

HLB values can also be used to determine the most preferred vehicle types. An HLB value lying between 1 and 22 gives the most preferred vehicle. HLB values are calculated by measuring the molecular weight of the idealised chemical structure of the species and then measuring the molecular weight percentage of the hydrophilic element of the structure. Division of this percentage value by 5 gives the HLB value.

The formulation may optionally include a dispersant which is used to improve the shelf-life and prevent sedimentation of any solid particulates. Said dispersant may comprise a backbone, the function of which is to provide compatibility with the carrier phase and a headgroup which anchors the dispersant onto the surface of the additive. Said dispersant may be selected from single molecule or polymeric species with a range of functionalities within the molecular backbone and anchor groups.

Said liquid formulation may include less than 30 wt %, preferably less than 20 wt %, more preferably less than 10 wt %, especially less than 5 wt % of a said dispersant. A dispersant may not be required if the additive is a dye.

In the method, the liquid formulation is preferably dosed into said polymeric material when said polymeric material is in a molten state. Said polymeric material may be melted in an extruder and said liquid formulation may be contacted with the polymeric material in said extruder or downstream thereof. Said liquid formulation is preferably injected at relatively high pressure (5-120 bar) into the polymeric material. A mixing means is suitably provided for facilitating mixing of the liquid formulation and polymeric material. The mixing means may be provided by using either static or dynamic mixers. Dynamic mixers are preferred in applications where liquid formulations are added to the melt phase of the polymer i.e. where small amounts of low viscosity fluid require mixing with large volumes of high viscosity fluid. Cavity transfer mixers are especially preferred due to the high distributive mixing forces that are applied down the length of the mixer enabling the required high shear process to be applied in a controllable manner. Downstream of the point of contact of liquid formulation and polymeric material, there may be a spinning means for spinning the polymeric material to define fibres. The same general set up could be used to make other articles from thermoplastic polymers; for example sheet or film—the means of exit would be through the relevant die heads.

Said polymeric material which is contacted in the method may be supplied directly from a reactor in which the polymeric material is made in a polymerisation reaction. Thus, said polymeric material used suitably does not comprise pellets or granules or other isolated polymeric material but suitably comprises molten polymeric material from a polymerisation reactor which is coupled to apparatus for contacting said polymeric material with liquid formulation as described.

According to a second aspect of the invention, there is provided a liquid formulation for addition to a polymeric material, said liquid formulation comprising an additive (for example a colourant) and a vehicle as described according to the first aspect.

The formulation may have any feature of the formulation of the first aspect.

According to a third aspect of the invention, there is provided a product comprising a polymeric material incorporating an additive (for example a colourant), wherein said product includes one or more of the following features:
 (a) free vehicle of the type described according to the first aspect;
 (b) a residue derived from said vehicle.

Free vehicle (or a residue) may be detected by a suitable technique for example extraction from the product followed by mass spectrometry or a chromatographic technique.

Said product of the third aspect is preferably a fibre, especially a polyester fibre.

Said product of the fourth aspect is preferably a film, sheet or pipe product especially a ester-containing polymer product. In one embodiment, the product may comprise a polycarbonate sheet or film.

According to a fourth aspect of the invention, there is provided an article incorporating a product of the third aspect. The product of the third aspect may be woven to define at least part of the article. The article may be a garment.

According to a fifth aspect, there is provide a method of producing a fibre, the method comprising introducing an additive into a polymeric material as described according to the first aspect and spinning the polymeric material which includes the additive to produce a fibre, suitably a substantially continuous length of fibre, for example of greater than 5 m or 10 m.

The method may include delivery of said polymeric material into an extruder directly from a reactor in which the polymeric material is produced.

Preferably, said polymeric material is a polyester, for example polyethylene terephthalate.

According to a sixth aspect, there is provided an assembly comprising:
 (a) an extruder for extruding polymeric material;
 (b) a receptacle containing a liquid formulation as described according to the first aspect;
 (c) injection means operatively connected to the receptacle for injecting liquid formulation extracted from the receptacle into the polymeric material in or downstream of the extruder;
 (d) mixing means for mixing liquid formulation and polymeric material.

The assembly may further include a polymerisation reactor for producing said polymeric material in a polymerisation reaction, suitably from monomers, said reactor being operatively connected to the extruder for delivering polymeric material from reactor to extruder.

The assembly may further comprise spinning means downstream of the extruder and injection means for receiving polymeric material which has been contacted with said liquid formulation and spinning the polymeric material to produce fibre.

Any invention described herein may be combined with any feature of any other invention or embodiment described herein *mutatis mutandis*.

Specific embodiments of the invention will now be described, by way of example with reference to FIG. 1 which is a schematic representation of a pilot fibre line.

The following materials are referred to hereinafter:
 DiPlast TM 7-9 as supplied by PolyNT—Trimellitate based predominantly on linear C7-C9 alcohols
 DIPLAST® TM/ST as supplied by Poly NT—Tris (2-ethylhexyl) trimellitate
 Solvent Blue 104 (Polysynthren Blue RBL) as supplied by Clariant
 DOVERPHOS S-9228T (Functionalised pentaerythritol diphosphite) as supplied by ICC Chemical corporation
 IRGANOX 1010 (Functionalised Pentaerthyritol) as supplied by CIBA SPECIALTY CHEMICALS
 AEROSIL R-972 (hydrophobic Silica) as supplied by Degussa
 CITHROL 2DE-PEG 200 Erucate as supplied by Croda

EXAMPLE 1—PREPARATION OF FORMULATIONS

Formulation A was prepared by adding 50 g of SOLVENT BLUE-104, 3 g of AEROSIL R-972, 0.1 g of Doverphos S-9228T and 0.1 g of Irganox 1010 to 46.8 g of DIPLAST TM7-9 using a high shear mixer.

Formulation B was prepared by adding 50 g of SOLVENT BLUE-104, 3 g of AEROSIL R-972, 0.1 g of Doverphos S-9228T and 0.1 g of Irganox 1010 to 46.8 g of DIPLAST® TM/ST using a high shear mixer.

Formulation C was prepared by adding 60 g of SOLVENT BLUE-104 and 2 g of AEROSIL R-972, to 38 g of DIPLAST® TM/ST using a high shear mixer.

Formulation D was prepared by adding 60 g of SOLVENT BLUE-104, and 2 g of AEROSIL R-972, to 38 g of RV-5043 using a high shear mixer.

Formulation E was prepared by adding 62 g of SOLVENT BLUE-104, 0.1 g of Doverphos S-9228T and 0.1 g of Irganox 1010 to 37.8 g of PEG 200 Dierucate.

EXAMPLE 2—GENERAL METHODS FOR INCORPORATION OF FORMULATIONS INTO PET FOR FIBRE PRODUCTION

Apparatus for use in the methods is shown in FIG. 1 which shows a hopper 1 for feeding additive, at the feedthroat, into an extruder containing PET. Alternatively, additive may be injected into the PET melt at position 2, using injection apparatus 4. Die head pressure may be assessed at positions 3. The mixture is spun via spinning head 6.

In the examples described below, the liquid formulations were incorporated into PET fibre at the feedthroat. A pilot fibre line was used (FET pilot line serial number C0037) using a Single Screw 030 mm L/D Ratio 24:1 with removable mixing tip' compression Ratio 2.5:1 at a throughput of 3 kg/h using a 72 hole spinneret at a draw ratio of 3:1 with roller speeds of 300 m/min (bottom) 600 m/min (middle) 900 m/min (top). This gave a final fibre diameter of ~20 µm.

The liquid formulations can be added to the extruder at the feedthroat (position 1) on a laboratory scale by manually coating a set amount of polymer pellets with the formulation and mixing to provide evenly coated pellets. These coated pellets were added to the hopper at the feedthroat. On a production scale, the mixing of liquid formulations with polymer pellets can be achieved by use of a pre-mixer.

Partially Oriented Yarn (POY) was produced using PET delivered direct from a polymer reactor which was pelletised prior to the laboratory-scale trials. This polymer was pre-dried (120° C. for 4 h followed by 165° C. for 8 h tumbled at 1 mbar pressure) and added to the extruder at a throughput of 5 kg/h. The 270 dtex yarn was produced using a spin speed of ~3000 m/min and a quench applied at 22° C.

The POY was drawn in order to reach a final elongation of about 30%, necessary for further processing into a fabric. Drawing is made in two stages on heated plates and godets at temperatures of 150° C. and 160° C., respectively.

Before drawing the POY bobbins were stored over night at standard climate conditions (20° C./65% r.h.). For drawing a ZINSER pilot draw winder was used and the draw ratio was set at 1:1.65.

Several meters of a knit fabric was made on a LUKAS circular knitting machine and the fabric subjected to heat setting where about one meter was submitted to a standard heat setting process on a MATHIS pad-stream device (High temperature steam: 95% Time of treatment at 190° C.: 1 Min). The fabrics were then treated to scouring with non-ionic detergent in order to remove spin finish and knitting oils. Then they were dried using room temperature air.

EXAMPLE 3—TESTING OF FORMULATIONS

Tensile measurements were taken using either a Hounsfield HTE M Series Tensiometer or an automatic Statimat M (Textechno). With the Hounsfield, a 72 strand sample (135 mm long) was extended at 150 cm/min using a 100N load cell. With the Statimat, a single strand sample (200 mm long) was extended at 400-500 mm/min (to give a test time of ~20 s) using a 100N load cell. 25 measurements were taken per bobbin to obtain average results.

Results are provided in Table 1.

TABLE 1

| POY sample reference | Denier/dtex | Elongation/% | Force/cN | Tenacity (cN/tex) |
|---|---|---|---|---|
| Virgin | 270 | 125 | 575 | 21 |
| Formulation-A @2% | 270 | 125 | 595 | 22 |
| Formulation B @ 2% | 270 | 125 | 600 | 22 |

NB: dtex = decitex which is a measure of the weight of yarn per unit length. Denier is another term for fibre weight that is known in the industry.

| FDY sample reference | Denier/dtex | Elongation/% | Tenacity (cN/tex) | Modulus (cN/tex) |
|---|---|---|---|---|
| Virgin | 168 | 33 | 32 | 680 |
| Formulation-A @2% | 168 | 32 | 35 | 769 |
| Formulation B @ 2% | 168 | 31 | 35 | 773 |

Similarly good samples were produced using Formulations C and D.

EXAMPLE 4—DYE WASH FASTNESS

Dye wash fastness is determined using a 'sandwich' of 10×4 cm$^2$ size which is sewed on one side with a white PET Dacron reference fabric and on the other side with a white cotton reference fabric 400-4E, both of the same size. For each dyed fabric a sandwich like this is prepared and each is placed in a beaker of 100 ml. Washing liquor containing 4 g/l ECE standard washing powder and 1 g/l soda are added to a liquor ration of 1:50. The beaker is closed and rotated for 30 min at 60° C. Then the sandwich is rinsed and the fabrics separated for drying at ambient air.

Fastness measurement is carried out according to DIN EN ISO 105-C06 while colour difference in form of 'mark of fastness' refers to the respective dyed sample before wash fastness test.

EXAMPLE 5—IRON FASTNESS

According to DIN 54022 for determination of iron fastness a HANAU Fixotest apparatus was used. Each dyed sample (size 11×5 cm) is subjected to dry heat of 150° C. for 15 sec. together with two layers of a wool fabric (height 3 mm) underneath and an accompanying cotton fabric 400-E4 on top, while this sandwich is placed between the heated plates of the testing apparatus. Fastness measurement and evaluation is carried out as already described above for dye wash fastness. Results for Examples 4 and 5 are provided below.

| | Wash fastness | | Iron fastness at 15 second exposure time | |
|---|---|---|---|---|
| Sample | ΔE | Mark of fastness | ΔE | Mark of fastness |
| Formulation A @ 2% | 0.48 | 5 | 0.41 | 5 |
| Formulation B @ 2% | 0.62 | 4-5 | 0.62 | 5 |

In each case, the samples exhibit excellent fastness properties.

EXAMPLE 6—UNIFORMITY TESTING

The Uster test is a measurement of the uniformity of yarn as it measures the capacitance between two plates as a given length of yarn travels between it. A discrepancy in the thickness of the yarn gives a change in the reading. The Uster measurement is a measure of the variation of the overall yarn from the mean value. The covariance value gives an indication as to the variation of this value. The results from the blue samples are shown below:

100 m/min 5 min test time 3.0 bar pressure.

| Sample | Um (%) | Variance of result (%) |
| --- | --- | --- |
| Virgin | 2.69 | 3.44 |
| Formulation A @2% | 2.98 | 3.68 |
| Formulation B @2% | 2.43 | 3.07 |

It should be appreciated from the results that, advantageously, no significant differences exist in elongation between spun virgin polymer and polymer spun with the formulations which include colourant as described. A favourable increase in tenacity is observed which indicates a slight positive impact of the formulation on the polymer. This compares favourably against a vehicle such as PEG 200 erucate where significant decreases in polymer physical properties are observed on addition to the polymer. When added by melt-injection, Formulation E (comparative example) decreased the spinning properties of the fibre at addition rates of ~2%. More broken filaments were observed. Variance in the physical properties was relatively high indicating poor dispersion—areas of undispersed carrier within the polymer matrix. It was also difficult to reach the required loading of pigment within the final fibre using this vehicle.

The process described is particularly suited to fibre grade polymers and has specific use in a process whereby the polymer is spun direct from the reactor. Polymer produced in this manner tends to have low IV (~0.65) and liquid addition causes degradation of the polymer structure which makes spinning fibre very difficult. The process and formulation outlined in this application allow recovery of the polymer characteristics and therefore spinning ability and tensile properties.

EXAMPLE 7—COMPATIBILITY

To test for vehicle compatibility in PET, a given amount of vehicle is moulded into PET (C93) using a BOY 22M with two step plaque mould (26 mm profile) using the following parameters:
Temps ° C.—285, 280, 275, 275
Screw speed—300 rpm
Back Pressure—50 BAR
Max injection pressure—160 BAR The resulting plaques are measured for % haze on a Minolta CM-3700d spectrophotometer using the spectromatch haze program (ASTM D1003), which involves flashing the thin part of the plaque against a white and black background to obtain a % haze FIGURE.

Compatible vehicles give a haze FIGURE of <50% at 1% addition level and typically can be added at levels of up to 3% before >50% haze can be detected. Incompatible vehicles typically give a high % haze value even at low addition rates—as highlighted above.

The invention claimed is:
1. A method of making a fibre comprising a polymeric material and at least one additive, the method comprising:
A) selecting a liquid formulation comprising at least one additive and a vehicle comprising an aromatic tricarboxylic acid covalently linked by ester bonds to two or more chains, wherein said chains comprise linear or branched alkyl groups with between 7 and 10 carbon atoms, wherein said liquid formulation contains a total amount of from 39 to 60 wt % of additives and at least 20 wt % of vehicle, and said at least one additive is selected from colourants, stabilizers, delusterants, antistatic agents, optical brighteners, processing aids, light reflective additives, anti-soil additives, friction modifiers, antioxidants, and anti-flammability additives;
B) contacting the liquid formulation with said polymeric material in a melt processing apparatus;
wherein said carboxylic acid is of general formula:

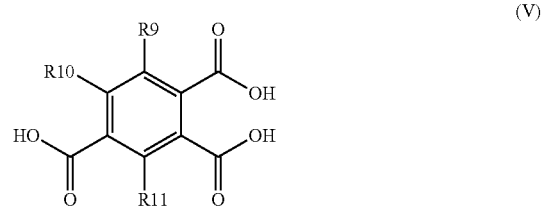

(V)

where $R^9$, $R^{10}$ and $R^{11}$ represent a hydrogen atom;
wherein the total amount of additives introduced into said polymeric material via said formulation in the method is at least 0.05 wt % and is less than 4 wt %;
wherein the total amount of vehicle introduced into said polymeric material via said formulation in the method is at least 0.0125 wt % and is less than 4 wt %;
wherein downstream of the point of contact of liquid formulation and polymeric material there is provided a spinning means for spinning the polymeric material to define fibres; and
wherein said polymeric material comprises a polyester.

2. A method according to claim 1, wherein said chains are unsubstituted and include 7 to 10 carbon atoms; and wherein said vehicle is a trimellitate.

3. A method according to claim 1, wherein said vehicle has a boiling point of greater than 285° C., and a molecular weight in the range 500 to 4200 g/mol.

4. A method according to claim 1, wherein said liquid formulation is dosed into said polymeric material when the polymeric material is in a molten state, and said liquid formulation is injected at a pressure in the range 5 to 120 bar into the polymeric material, wherein a mixing means is provided for facilitating mixing of the liquid formulation and polymeric material.

5. A method according to claim 4, wherein said mixing means comprises a cavity transfer mixer.

6. A method according to claim 1, wherein said ester-containing vehicle is formed by reacting a selected tricarboxylic acid with alkyl-containing moieties to provide the alkyl groups.

7. A method according to claim 1, wherein said vehicle has a viscosity of between 100,000 cP and 1,000 cP.

8. A method according to claim 1, wherein said polyester has an IV in the range of 0.5 to 1.2 dl/g.

9. A method according to claim 1, wherein said vehicle comprises a trimellitate, has a boiling point of greater than 285° C., and a molecular weight in the range of 500 to 4,200 g/mol; and wherein said polyester has an IV in the range of 0.5 to 1.2 dl/g.

10. A method according to claim 9, wherein said at least one additive is a colourant.

11. A method according to claim 10, wherein the total amount of vehicle introduced into said polymeric material via said formulation in the method is at least 1 wt %; and wherein said at least one additive is a colourant.

12. A method according to claim 1, wherein said vehicle comprises a trimellitate; wherein said polyester has an IV within the range of 0.5 to 1.2 dl/g; and wherein said at least one additive is a colourant.

13. A method according to claim 1, wherein at least 2 wt % of said liquid formulation is contacted with said polymeric material in the method.

14. A method according to claim 1, wherein said liquid formulation is dosed into said polymeric material when the polymeric material is in a molten state.

15. A method according to claim 1, wherein the total amount of vehicle introduced into said polymeric material via said formulation in the method is at least 1 wt %; wherein said at least one additive is a colorant; wherein said vehicle comprises a trimellitate; wherein said polyester has an IV within the range 0.5 to 1.2 dl/g; and wherein said liquid formulation is dosed into said polymeric material when the polymeric material is in a molten state.

16. A method according to claim 15, wherein at least 2 wt % of said liquid formulation is contacted with said polymeric material in the method.

17. A method according to claim 14, wherein said polymeric material which is contacted in the method is supplied directly from a reactor in which the polymeric material is made in a polymerisation reaction.

\* \* \* \* \*